United States Patent
Linker et al.

(10) Patent No.: US 7,043,689 B2
(45) Date of Patent: May 9, 2006

(54) MANAGING ZERO-WIDTH MARKERS

(75) Inventors: Bruce A. Linker, Sammamish, WA (US); Frank Rubino, Bloomfield, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 655 days.

(21) Appl. No.: 10/085,227

(22) Filed: Feb. 26, 2002

(65) Prior Publication Data

US 2004/0205634 A1    Oct. 14, 2004

(51) Int. Cl.
G06F 17/21 (2006.01)
G06F 17/24 (2006.01)
G06F 17/00 (2006.01)
G06F 15/00 (2006.01)

(52) U.S. Cl. .................. 715/526; 715/520; 715/521
(58) Field of Classification Search ............... 715/526, 715/531, 530, 529
See application file for complete search history.

(56) References Cited

U.S. PATENT DOCUMENTS

| | | | |
|---|---|---|---|
| 6,092,068 A * | 7/2000 | Dinkelacker ............. | 707/100 |
| 6,138,116 A * | 10/2000 | Kitagawa et al. ......... | 707/5 |
| 6,167,439 A * | 12/2000 | Levine et al. ............ | 709/217 |
| 6,393,445 B1 * | 5/2002 | Chien ................... | 715/536 |
| 6,565,609 B1 * | 5/2003 | Sorge et al. ............. | 715/503 |
| 6,597,314 B1 * | 7/2003 | Beezer et al. ............ | 1/1 |
| 6,694,302 B1 * | 2/2004 | Chuang et al. ........... | 706/46 |
| 6,744,447 B1 * | 6/2004 | Estrada et al. ........... | 715/751 |
| 6,832,351 B1 * | 12/2004 | Batres .................. | 715/505 |
| 2002/0113810 A1 * | 8/2002 | Radtke et al. ........... | 345/710 |

OTHER PUBLICATIONS

Screen Shots, Microsoft Word 2000, 1999, pp 1-3.*
Screen Shots, Microsoft Word 2000, 1999, pp 4.*
Camarda, Bill; Using Microsoft Word 2002; 2001; Que.*
Zhang, Zhengyou, et al.; Visual panel: virtual mouse, keyboard and 3D controller with an ordinary piece of paper; Nov. 2001; ACM Press; ACM International Conference Proceeding Series; vol. 15; pp 1-8.*
Victoria Rasmussen, "Corel WordPerfect: Editing", Academic Computing and Library Information Services (ACLIS) at the Marriott Library, (1) page, Apr. 1998.
Microsoft Corporation, "Microsoft Word 2000 Reveal Codes White Paper", http://www.support.microsoft.com/default. aspx?scid=KB;EN-US;q271478, (16) pages, Aug. 2000.
Adobe Systems, "Adobe FrameMaker 6.0", User Guide, Chapters 2, 3, 6, 7, 13, 15, and 18, 2000.

* cited by examiner

Primary Examiner—William Bashore
Assistant Examiner—N Hillery
(74) Attorney, Agent, or Firm—Fish & Richardson P.C.

(57) ABSTRACT

Computer programs and computer-implemented methods implement techniques for displaying zero-width markers in an electronic document. An electronic document including content having a visual content is provided. The electronic document includes one or more markers having locations in the content, the markers not being represented in the content. Input specifying one or more locations in the electronic document is received. The presence of one or more markers associated with one or more locations in the specified locations is detected in response to the input. A visual representation of the detected markers is displayed. In preferred embodiments, the display of the visual representation does not alter the visual composition of the document.

16 Claims, 4 Drawing Sheets

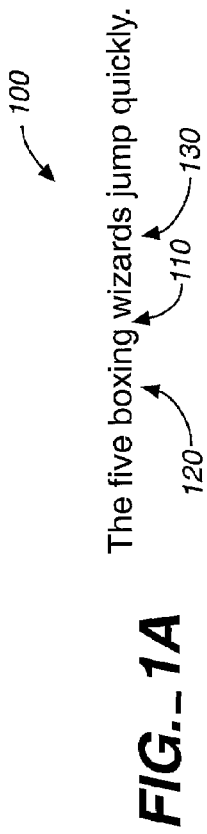
FIG._1A
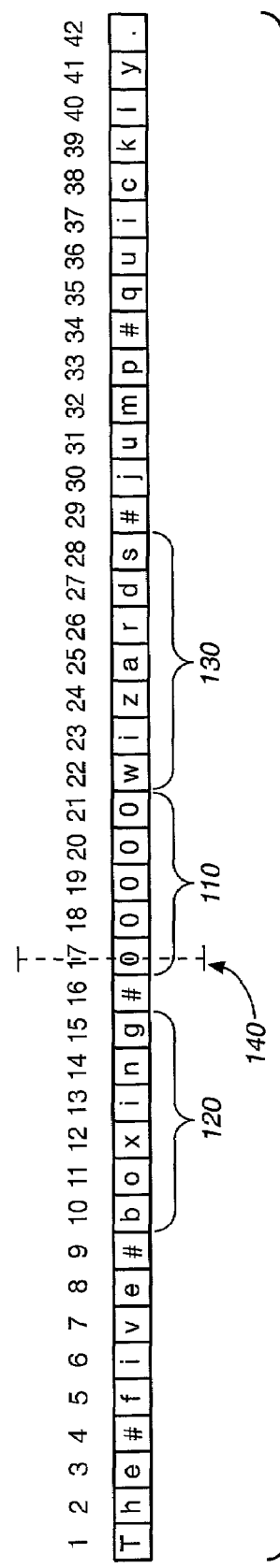
FIG._1B
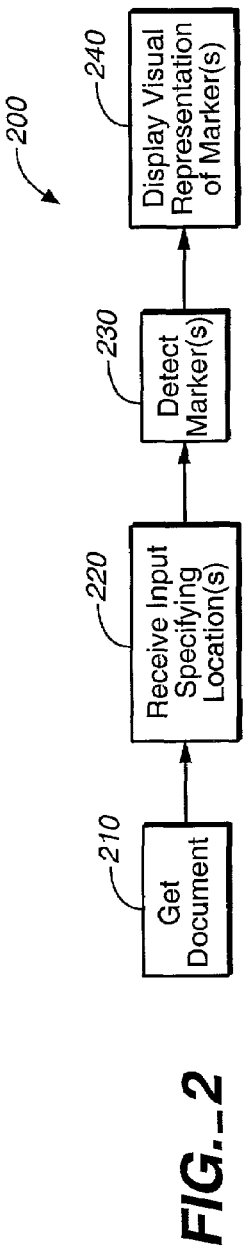
FIG._2

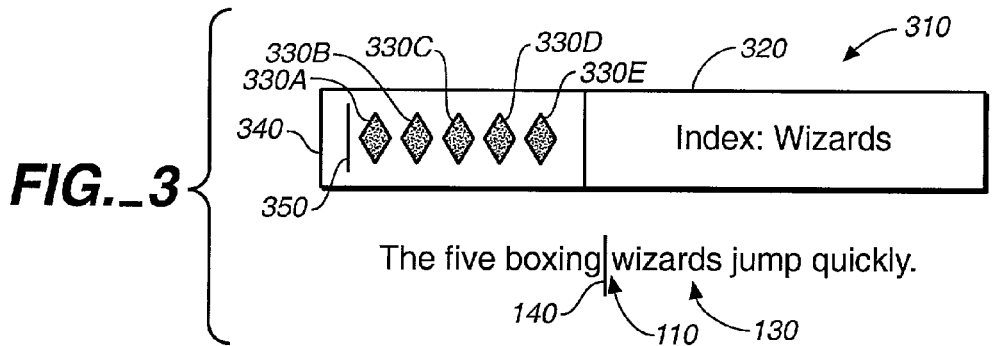
FIG._3
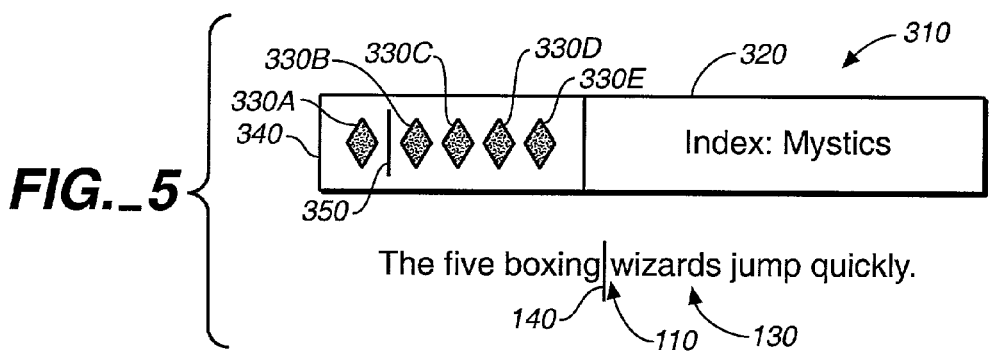
FIG._5
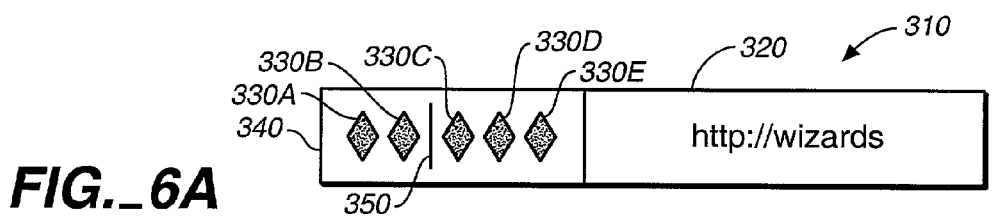
FIG._6A
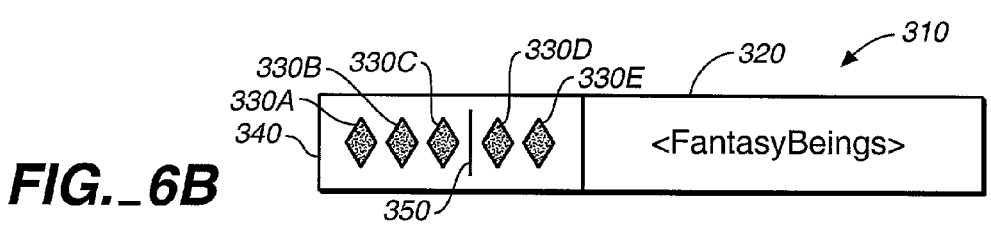
FIG._6B
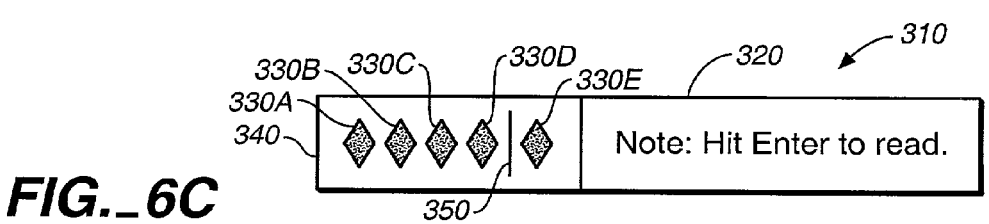
FIG._6C

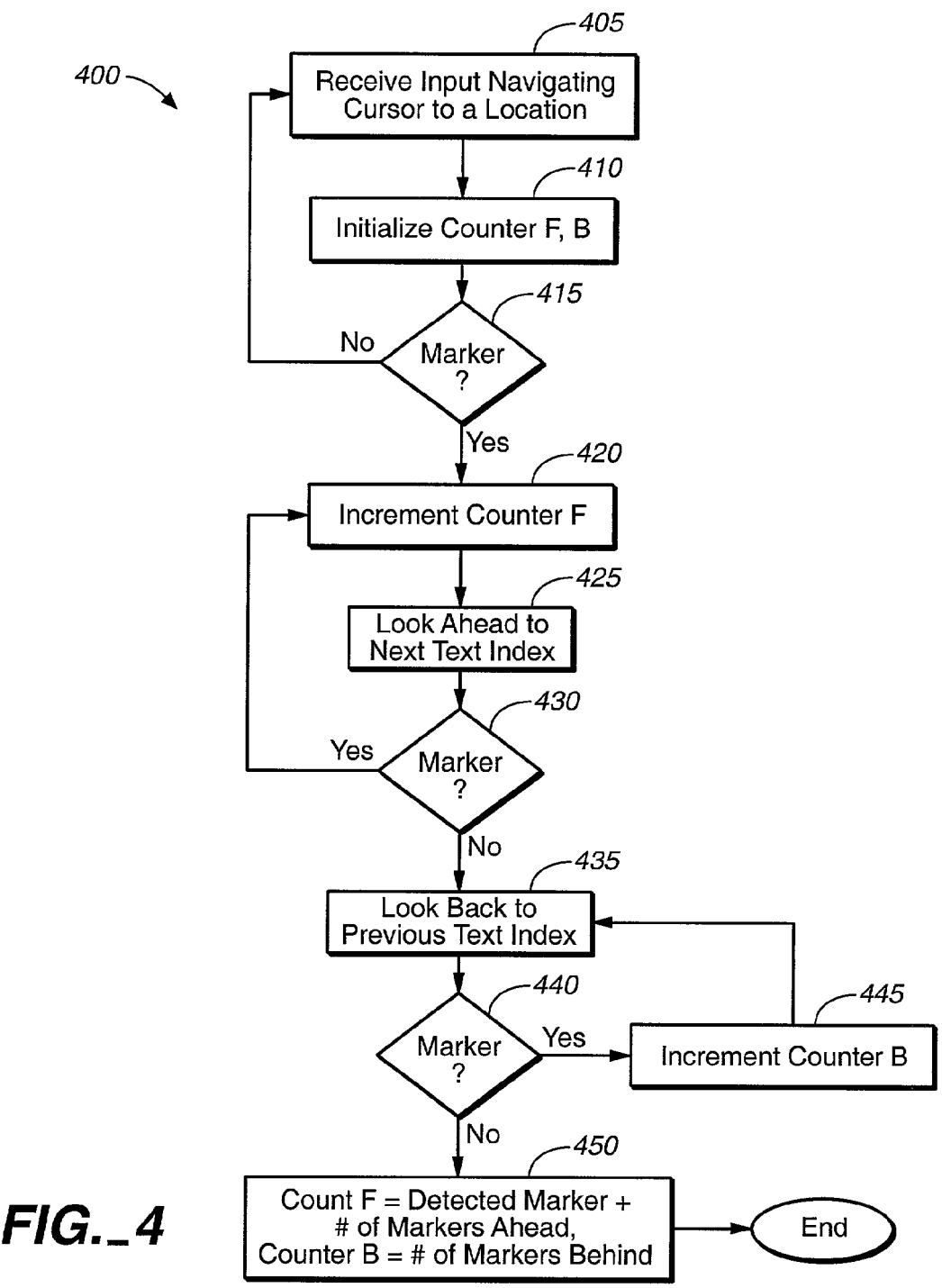
FIG._4

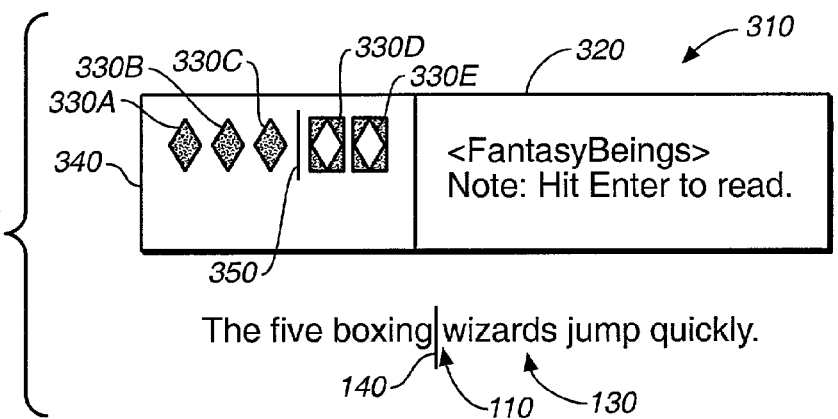
FIG._7
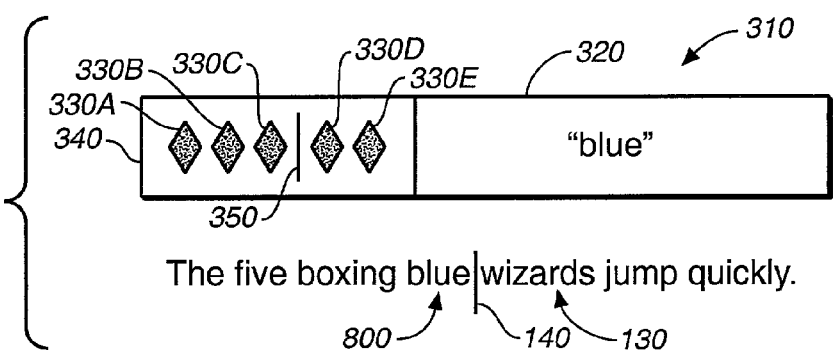
FIG._8

MANAGING ZERO-WIDTH MARKERS

BACKGROUND

This invention relates to the use of markers in desktop publishing and word processing applications.

Markers are frequently used in desktop publishing and word processing to represent an attribute or data—such as hyperlinks, indexing, notes, or extensible markup language (XML) tags—associated with content where the marker is found in a document. Markers are typically placed at desired locations in a document in the same fashion as characters are placed in a document (and, indeed, can be represented by characters in the document). Thus, for example, in an electronic document an instance of the word "Adobe" can have an associated index marker labeled Software Companies, representing an index entry for Software Companies with a reference to that instance of Adobe.

However, while markers thus provide users information, it is often desirable to avoid altering the display of the visual composition of the document, which would result from the insertion into a document of visible characters representing a marker. To that end, markers are often defined to have no width—called zero-width markers—such that they take up no "space" in the document and therefore do not affect the document's visual composition. Since such a marker takes up no space, it is essentially invisible to the user; the only indication to the user that the marker exists may be that the cursor or insertion point (the blinking vertical line where new characters appear as the user types) temporarily stays still as the user navigates through a region of the document that is populated with markers. As a result, when there are multiple markers in one location of a document, the cursor appears to stay in one place even when the user moves it (e.g., by using the cursor keys) through each marker. This can be confusing to a user who is unaware of the markers, who may wonder why the cursor is not moving. Even if the user is aware that zero-width markers are present in the document, it can still be hard to manipulate the markers—for example, to determine which marker is selected for modification or deletion.

SUMMARY

The invention provides methods and apparatus, including computer program apparatus for visually representing hidden markers in a document.

In general, in one aspect, the invention features computer-implemented methods and apparatus, including computer program apparatus, implementing techniques for displaying one or more detected markers in an electronic document. The techniques include providing an electronic document that includes content having a visual composition and one or more markers that have locations in the content. The markers are not represented in the visual composition of the content. The techniques also include receiving input specifying one or more locations in the electronic document; in response to the input, detecting the presence of one or more markers associated with one or more locations of the specified locations; and displaying a visual representation of the detected markers. The electronic document includes one or more markers having locations in the content. The markers are not represented in the content.

Particular implementations can include one or more of the following features. The input specifying one or more locations can include input directing that a cursor be placed at a location in the electronic document. The input specifying one or more locations can include input selecting a portion of the electronic document. The portion of the electronic document can include a word, sentence, or paragraph in the electronic document. The detected markers can include a plurality of markers having different locations in the selected portion. The visual representation of the detected markers can include one or more graphical elements representing the detected markers. Displaying the visual representation of the detected markers can include inserting the graphical elements representing the detected markers into the visual composition of the content at the locations of the detected markers, or separately displaying the graphical elements and the visual composition of the content.

Particular implementations can also include displaying a visual representation of data or attributes associated with the detected markers; receiving input navigating the cursor through the location of the detected markers, and in response to the input, displaying a change in a location of a cursor relative to the location of the one or more markers; hiding the visual representation of the detected markers when the cursor has navigated past the location of the detected markers; in response to detecting the presence of one or more markers, displaying a list of functions associated with one or more of the detected markers; and/or receiving an input selecting a function in the list of functions, and processing a marker according to the selected function. The input directing that a cursor be placed at a location in the electronic document can include input moving a mouse pointer to a location in the electronic document. The input directing that a cursor be placed at a location in the electronic document can include one or more cursor key strokes.

In general, in another aspect, the invention features computer-implemented methods and apparatus, including computer program apparatus, implementing techniques for displaying a plurality of detected markers in an electronic document. The techniques include providing an electronic document that includes content having a visual composition and a plurality of markers that have locations in the content. The plurality of markers are not represented in the visual composition of the content. The techniques also include receiving input specifying one or more locations in the electronic document; in response to the input, detecting the presence of a plurality of markers associated with a location of the specified locations; and displaying a visual representation of the detected markers.

Particular implementations can include one or more of the following features. The visual representation of the detected markers can include a plurality of graphical elements representing the detected markers. Displaying the visual representation of the detected markers can include inserting the plurality of graphical elements representing the detected markers into the visual composition of the content at the location of the detected markers. Displaying the visual representation of the detected markers can include separately displaying the plurality of graphical elements and the visual composition of the content.

Particular implementations can also include: displaying a visual representation of data or attributes associated with the detected markers; receiving input navigating the cursor through the location of the detected markers, and in response to the input, displaying a change in a location of a cursor relative to the location of the markers; and hiding the visual representation of the detected markers when the cursor has navigated past the location of the detected markers.

Advantages that can be seen in implementations of the invention can include one or more of the following. Automatically displaying a visual representation of a detected zero-width marker alerts a user to its presence in the document. Displaying a visual representation of a zero-width marker allows the user to easily select and modify (or edit) the marker. Multiple co-located markers are presented to the user in a serially accessible format. Other features, objects, and advantages of the invention will be apparent from the description and drawings, and from the claims.

DESCRIPTION OF DRAWINGS

FIGS. 1A–1B illustrate a passage of text including zero-width markers.

FIG. 2 illustrates a method 200 of managing zero-width markers in an electronic document.

FIG. 3 illustrates a tip window identifying the presence of a zero-width marker and what the marker represents.

FIG. 4 illustrates a method of detecting one or more zero-width markers.

FIG. 5 illustrates the tip window of FIG. 3 as the cursor is navigated to the right.

FIGS. 6A–6C illustrate the tip window of FIG. 3 as the cursor continues to navigate to the right.

FIG. 7 illustrates a tip window in which the user selects markers for modification.

FIG. 8 illustrates a tip window in which the user types new characters in between detected markers.

Like reference symbols in the various drawings indicate like elements.

DETAILED DESCRIPTION

FIG. 1A illustrates a passage of text 100 in an electronic document, as it might be displayed to a user of a conventional desktop publishing or word processing application. In such applications, all or a portion of the text can be associated with one or more markers representing attributes or information associated with the text. Markers are typically used to keep track of particular regions of text or other document content, and to associate logical attributes with them. For example, markers can be used in an electronic document for representing an index entry, a hyperlink, a note or comment, or a beginning or ending XML tag. The attributes and information referenced by a marker can be visible (e.g. Bolding) or not (e.g., a hyperlink or dictionary source marker). But where it is desired that the marker itself (as opposed to the attributes or information it references) not affect the visual composition of the document, the marker can be defined to have zero-width so that it will not be visible in the composed document.

Zero-width markers can be placed at desired locations in the document in the same fashion as regular characters (e.g., text characters) are placed in the document. Thus for example, each character and zero-width marker of text passage 100 can be assigned to a text index, which represents the position of each character (and marker) in the document. Referring to FIG. 1B, the letter "g" in the word "boxing" 120 is assigned to text index 15 and five zero-width markers, each represented by "0", are assigned to text indices 17–21, respectively. A marker will thus have one or more associated position values that define its location in the document. These values can be adjusted so as to track a particular portion of text. Markers can also be used to do things other than mark text, such as to insert graphics (such as pictures) into the flow of the text. In non-text formats, markers can contain metadata such as uniform resource locators (URLs) or other workflow-system specifiers—e.g., a placed image in an Adobe® Illustrator® document can have a series of URLs and other attributes such as extensible metadata platform (XMP) packets. Also, in 3-D modeling applications, a wireframe element can have markers that contain, for example, textures, XMP packets, and database record pointers. The attributes and data referenced by markers can have associated properties and/or commands (e.g., properties of a Note in InCopy can be the comments referenced by the Note; an "untag" command can be used in connection with an XML tag to remove the tag). Because the markers have zero-width and take up no space, multiple zero-width markers can be associated to the same text—and the same location relative to the text—in a document, without affecting the document's visual composition.

In a typical desktop publishing program, the user navigates through the content of an electronic document (e.g., using the cursor keys), thereby causing a visible cursor to move sequentially from character to character (e.g., sequentially through the text indices as shown in FIG. 1B). If the document being viewed includes a zero-width marker or markers, when the user attempts to navigate the cursor through a region of content including the marker(s), the cursor will appear to stop moving while it navigates through the marker(s) in zero width increments. Thus, assuming passage of text 100 includes five zero-width markers associated with the word "wizards" 130 in location 110 (i.e., the space between the words "boxing" 120 and "wizards" 130), the user must invoke five cursor key commands to navigate through location 110 (i.e., through the markers located at text indices 17–21).

FIG. 2 illustrates a general method 200 for managing zero-width markers in an electronic document. This method, and other methods and systems described herein, can be implemented in conventional desktop publishing program such as Adobe InDesign®, available from Adobe Systems Incorporated of San Jose, Calif.

The method 200 begins by providing a document including content containing one or more zero-width markers for output to a display (step 210). Method 200 receives input specifying one or more locations in the content of the document (step 220). The input can direct the cursor to a location in the electronic document. The input can also select one or more portions of the electronic document (thereby specifying locations within the selected portions), which can include, for example, a paragraph, a line, or a word within the document. Method 200 detects the presence of the one or more zero-width markers (step 230), e.g., by recognizing an invisible character representing a marker within the specified locations of the content. Method 200 then generates and displays a visual representation of the detected markers (step 240), as will be discussed in more detail below.

FIG. 3 illustrates one example of a user interface for a program configured to implement the method of FIG. 2. In the example of FIG. 3, the word "wizards" 130 has five associated zero-width markers, including index entries for "Wizards" and "Mystics", a hyperlink pointing to the URL "http://wizards", a beginning XML tag using the name "FantasyBeing", and an InCopy note that contains comments. Referring to FIG. 1B, the five zero-width markers associated with the word "wizards" 130 are assigned sequentially to text indices 17–21 at location 110. As shown in FIG. 3, upon detecting a zero-width marker (e.g., when the user navigates cursor 140 to location 110), the program creates a visual representation of the marker or markers, such as a tip window 310, alerting the user to the presence of the otherwise invisible markers. The program can also display information identifying the marker, here showing the marker type (i.e., the kind of attribute or data that the marker represents), as well as the particular attribute or data associated with the marker. Preferably, the display of the visual representation does not alter the visual composition of the document. Thus, for example, tip window 310 can be superimposed over the document content, at a point near the current location of cursor 140. As shown in FIG. 3, the first one of the five markers assigned to location 110 includes an Index type marker that associates the word "wizards" 130 to an Index entry for "Wizards" and the information is displayed in a field 320 of tip window 310.

To facilitate manipulation (e.g., modification) of markers, tip window 310 can also include a graphical element 330A representing the detected marker, and graphical elements 330B–E representing the other zero-width markers assigned next to the current location of the cursor (here, the four markers in text indices 18–21 assigned to the locations adjacent to the current position of cursor 140 at text index 17).

FIG. 4 shows one implementation of a method of detecting the total number of markers, if any, assigned to locations adjacent to a cursor position. Method 400 begins by receiving an input navigating a cursor to a location in the electronic document (step 405)—for example, a cursor 140 can be navigated to text index 17 as shown in FIG. 1B. Method 400 initializes counters F and B to zero (step 410). Counter F can be used to maintain a value representing a detected marker at the cursor position and the total number of markers positioned in text indices after the detected marker and counter B can be used to maintain a value representing the total number of markers positioned in text indices before a detected marker in the electronic document as explained in greater detail below. If the cursor is not positioned on a marker, then method 400 returns to step 405. If the cursor is positioned on a marker then counter F is incremented (step 420). Referring again to FIG. 1B, since the cursor 140 is positioned on text index 17, counter F is set with a value 1. Method 400 looks ahead to the next text index (step 425). As shown in FIG. 1B, the next text index ahead is text index 18. Method 400 determines if the next text index ahead contains a zero-width marker (step 430), and if the next text index has a zero width marker, counter F is incremented once again in step 420. In the example of FIG. 1B, since text index 18 contains a zero-width marker, counter F is incremented to a value of 2. Method 400 repeats steps 420–430 for the following text indices until all of the adjacent markers in the following text indices ahead of the detected marker have been counted. Thus in the example of FIG. 1B, method 400 repeats steps 420–430 through text indices 19–21, and counter F contains a value of 5.

Method 400 returns to text index 17 and looks back to the previous text index (step 435). Method 400 determines if the previous text index contains a zero-width marker (step 440), and if the previous text index contains a zero-width marker, counter B is incremented (step 445). Method 400 repeats steps 435–445 until all of the adjacent markers located in text indices before the detected marker have been counted. Referring again to FIG. 1B, since text index 16 contains a space (#), counter B remains at zero. Once all of the adjacent markers before and after the detected marker have been counted, counter F contains a value that represents the total number of markers after the detected marker (including the detected marker) and counter B represents the total number of markers before the detected marker (step 450).

Referring back to FIG. 3, each marker can be represented by a separate graphical element 330A–E (the total number of graphical elements correspond to the values contained in counters F and B), and the user can navigate through the markers using standard navigation methods, such as cursor keys. Thus, as shown in FIG. 3, a cursor 140, located at an area 110 in passage 100, can also be represented by a corresponding cursor 350 displayed in field 340 among graphical elements 330A–E. Referring to FIG. 5, when the user navigates cursor 140 to the right through the markers assigned to location 110, cursor 350 moves through graphical element 330A to a point to the left of graphical element 330B, here the second of the five markers assigned to location 110 representing an index entry for "Mystics" (displayed in field 320). Further navigation through the remaining markers assigned to location 110 yields similar results as shown in FIGS. 6A–6C. In this fashion, the user can continue to graphically navigate through the markers until cursor 350 has navigated through all of the graphical elements 330A–E and the cursor 140 meets up with regular characters in the composition. At this point, the tip window can be removed from the display.

The user can select an individual marker by selecting a corresponding graphical element using conventional techniques in the graphical display—for example, by using the shift key in combination with one or more arrow keys to provide extended selection in tip window 310. The user's selection can be graphically represented in tip window 310—for example, by highlighting the graphical elements 330D–E corresponding to the selected markers as shown in FIG. 7. The user can then edit (e.g., delete, cut, paste, copy and the like) or otherwise process the selected markers—for example, by selecting a delete key to remove the markers or by selecting a return key to invoke the properties of the markers. In FIG. 7, the selected markers are the beginning XML tag "<FantasyBeings>" and the InCopy note as displayed in field 320 of the tip window.

The user can act upon the graphical elements in the tip window in other ways as well, in much the same way that other characters are acted upon in the document. For example, referring to FIG. 8, the user can navigate cursor 350 to the point between graphical elements 330C and 330D in field 340 and type in new characters represented by the word "blue" 800. As a result, the typed characters—that is, the word "blue" 800—now appears in text passage 100 at the location of cursor 140, in between the locations of the third and fourth markers, represented by graphical elements 330C and 330D, respectively. The new characters entered between the markers can be displayed in field 320 of tip window 310.

In one implementation, the graphical display of zero-width markers can take the form of a Marker Manager Panel, performing functions similar to the tip window 310 described above, and further providing access to additional marker-related functionality. Thus, for example, when the user navigates the cursor to a location assigned an index marker, a popup menu can appear that provides the user with commands that can be used with that particular index marker (e.g., a command to change a reference to that particular index can appear in the menu). Plugins that use special-purposed zero-width markers along with functions to work with them can also make themselves known to the manager. When the cursor navigates to a marker, the Marker Manager makes a standard call to the plugin and gets available commands (or functions) for the popup menu to be used in connection with the marker. Optionally, when the Marker Manager is open, context sensitive commands can be available to the user.

The Marker Manager window can be configured to appear only when the cursor navigates through a location in the document that is associated with one or more zero-width markers. Alternatively, the Marker Manager can be permanently displayed in the user interface (or displayed in response to user input) as a conventional window or other graphical element that includes relevant marker information for a marker when the cursor navigates to a location associated with the marker.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, the tip window can be a dialog panel, or other conventional graphical display. Moreover, the tip window can appear to the user on the display in a fixed position or any other position (e.g., user defined) in the display of the electronic document, and not necessarily in relation to the position of the cursor. The tip window can appear when a mouse pointer appears over a location assigned with one or more zero-width markers. The Marker Manager Panel can optionally be displayed to the user when the cursor is not at a location in document containing a zero-width marker. Accordingly, other embodiments are within the scope of the following claims.

What is claimed is:

1. A computer-implemented method for processing an electronic document including content, the electronic document having a visual composition of the content the method comprising:

displaying the visual composition of the electronic document;

receiving a first user input specifying a location for an insertion-point cursor representing an insertion position in the content and displaying the insertion-point cursor in the visual composition, the insertion position being a position in the content where user-typed characters are placed;

in response to the first input, determining whether one or more markers in the content are adjacent to the insertion position, the markers not being represented in the visual composition;

if one or more markers in the content are adjacent to the insertion position, generating a visual representation of each marker or unbroken sequence of markers adjacent to the insertion position, wherein generating a visual representation of each marker or unbroken sequence of markers comprises displaying the visual representation in a tip window;

receiving a second user input to navigate a markers cursor among the markers in the visual representation, the markers cursor being a cursor displayed in the visual representation; and closing the tip window when user has moved the insertion-point cursor so that the insertion position is not adjacent to any markers.

2. The method of claim 1, further comprising:

receiving a third user input to navigate the insertion-point cursor and in response to the third user input moving the insertion position through the one or more markers in the content while not changing the position of the insertion-point cursor in the visual composition.

3. The method of claim 1, further comprising:

removing the visual representation when user has moved the insertion-point cursor so that the insertion position is not adjacent to any markers.

4. The method of claim 1, further comprising:

providing an interface for a user to edit properties of each marker displayed in the visual representation.

5. The method of claim 1, wherein:

the generated visual representation displays properties associated with a marker positioned immediately before or after the insertion point; and the properties comprise a marker type, the marker type being a kind of attribute or data that the marker represents, and a particular attribute or data associated with the marker.

6. The method of claim 1, wherein:

the visual representation does not alter the visual composition of the document.

7. A computer program product, tangibly stored on a computer-readable medium, operable to cause a data processing apparatus to perform operations comprising:

displaying the visual composition of the electronic document;

receiving a first user input specifying a location for an insertion-point cursor representing an insertion position in the content and displaying the insertion-point cursor in the visual composition, the insertion position being a position in the content where user-typed characters are placed;

in response to the first input, determining whether one or more markers in the content are adjacent to the insertion position, the markers not being represented in the visual composition;

if one or more markers in the content are adjacent to the insertion position, generating a visual representation of each marker or unbroken sequence of markers adjacent to the insertion position, wherein generating a visual representation of each marker or unbroken sequence of markers comprises displaying the visual representation in a tip window;

receiving a second user input to navigate a markers cursor among the markers in the visual representation, the markers cursor being a cursor displayed in the visual representation; and closing the tip window when user has moved the insertion-point cursor so that the insertion position is not adjacent to any markers.

8. The computer program product of claim 7, further operable to cause the data processing apparatus to perform the following operations:

receiving a third user input to navigate the insertion point cursor and in response to the third user input moving the insertion position through the one or more markers in the content while not changing the position of the insertion point cursor in the visual composition.

9. The computer program product of claim 7, further operable to cause the data processing apparatus to perform the following operations:

removing the visual representation when user has moved the insertion point cursor so that the insertion position is not adjacent to any markers.

10. The computer program product of claim 7, further operable to cause the data processing apparatus to perform the following operations:

providing an interface for a user to edit properties of each marker displayed in the visual representation.

11. A computer-implemented method for processing an electronic document including content, the electronic document having a visual composition of the content, the method comprising:

displaying a visual composition of an electronic document;

receiving a first user input specifying one or more portions of content;

in response to the first input, determining whether one or more markers exist in the specified portions, the markers not being represented in a visual composition;

if one or more markers exist in the specified portions, generating a visual representation of the markers in the specified portions, wherein generating a visual representation of each marker or unbroken sequence of markers comprises displaying the visual representation in a tip window;

receiving a second user input to navigate a markers cursor among the markers being displayed in the visual representation, the markers cursor being a cursor displayed in the visual representation and not in the visual composition; and closing the tip window when user has moved the insertion-point cursor so that the insertion position is not adjacent to any markers.

12. The method of claim 11, further comprising:

providing an interface for a user to edit properties of each marker displayed in the visual representation.

13. The method of claim 11, wherein:

the visual representation displays properties associated with a marker displayed in the visual representation; and the properties comprise a marker type, the marker type being a kind of attribute or data that the marker represents, and a particular attribute or data associated with the marker.

14. A computer program product, tangibly stored on a computer-readable medium, operable to cause a data processing apparatus to perform operations comprising:

displaying a visual composition of an electronic document;

receiving a first user input specifying one or more portions of content;

in response to the first input, determining whether one or more markers exist in the specified portions, the markers not being represented in a visual composition;

if one or more markers exist in the specified portions, generating a visual representation of the markers in the specified portions, wherein generating a visual representation of each marker or unbroken sequence of markers comprises displaying the visual representation in a tip window;

receiving a second user input to navigate a markers cursor among the markers being displayed in the visual representation, the markers cursor being a cursor displayed in the visual representation and not in the visual composition; and closing the tip window when user has moved the insertion-point cursor so that the insertion position is not adjacent to any markers.

15. The computer program product of claim 14, further operable to cause the data processing apparatus to perform the following operations:

providing an interface for a user to edit properties of each marker displayed in the visual representation.

16. The computer program product of claim 14, wherein:

the visual representation displays properties associated with a marker displayed in the visual representation; and the properties comprise a marker type, the marker type being a kind of attribute or data that the marker represents, and a particular attribute or data associated with the marker.

* * * * *